(12) United States Patent
Sridharan et al.

(10) Patent No.: US 7,087,447 B2
(45) Date of Patent: Aug. 8, 2006

(54) METHOD FOR FABRICATING ZIG-ZAG SLABS FOR SOLID STATE LASERS

(75) Inventors: Arun Kumar Sridharan, Palo Alto, CA (US); Shailendhar Saraf, San Jose, CA (US); Robert L. Byer, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 411 days.

(21) Appl. No.: 10/696,278

(22) Filed: Oct. 28, 2003

(65) Prior Publication Data

US 2005/0090030 A1    Apr. 28, 2005

(51) Int. Cl.
 *H01L 21/00* (2006.01)
(52) U.S. Cl. .............................. 438/27; 372/11; 372/70
(58) Field of Classification Search .................. 438/27, 438/69; 372/66; 385/129; 359/333
See application file for complete search history.

(56) References Cited

U.S. PATENT DOCUMENTS

| | | | |
|---|---|---|---|
| 4,894,839 A | 1/1990 | Baer | 372/93 |
| 5,441,803 A | 8/1995 | Meissner | 428/220 |
| 5,479,430 A | 12/1995 | Shine, Jr. et al. | 372/66 |
| 5,841,805 A * | 11/1998 | Injeyan et al. | 372/69 |
| 6,014,393 A | 1/2000 | Fulbert et al. | 372/41 |
| 6,094,297 A | 7/2000 | Injeyan et al. | 359/345 |
| 6,134,258 A | 10/2000 | Tulloch et al. | 372/99 |
| 6,256,142 B1 | 7/2001 | Injeyan et al. | 359/345 |
| 6,284,085 B1 | 9/2001 | Gwo | 156/273.7 |
| 6,377,593 B1 | 4/2002 | Peterson et al. | 372/11 |
| 6,458,176 B1 | 10/2002 | Yeh et al. | 44/437 |
| 6,472,242 B1 | 10/2002 | Peterson et al. | 438/27 |
| 6,548,176 B1 | 4/2003 | Gwo | 428/420 |
| 6,566,152 B1 * | 5/2003 | Peterson et al. | 438/27 |
| 2002/0171918 A1 | 11/2002 | Clapp | 359/342 |

* cited by examiner

*Primary Examiner*—Bradley W. Baumeister
*Assistant Examiner*—Matthew L. Reames
(74) *Attorney, Agent, or Firm*—Lumen Intellectual Property Services, Inc.

(57) ABSTRACT

A method for batch manufacturing of slabs for zig-zag lasers including steps of bonding two non-active media to either side of an active medium to form a sandwich, dicing the sandwich to provide slices, rendering two surfaces of each slice into total-internal-reflection (TIR) surfaces, and then dicing the slices perpendicular to the TIR surfaces to provide a plurality of zig-zag slabs.

16 Claims, 4 Drawing Sheets

METHOD FOR FABRICATING ZIG-ZAG SLABS FOR SOLID STATE LASERS

GOVERNMENT SPONSORSHIP

This invention was supported by NASA under contract number NAS1-00104 and by the Army-MURI funding under contract number DAAD19-02-1-0184. The government has certain rights in this invention.

FIELD OF THE INVENTION

The present invention relates to a method for fabricating slab media for solid state lasers and in particular to a method for fabricating large numbers of slabs supporting zig-zag propagation of light therethrough.

BACKGROUND OF THE INVENTION

Solid state lasers have been found very useful for generating high power laser beams. A typical solid state laser has two main parts: a solid state laser medium and a pump source. The pump source can be another laser or array of lasers, an arc lamp, a flashlamp or some other suitable source of illumination. The solid state laser medium is typically a slab of material doped with appropriate active lasant, e.g., an active ion such as Nd, Er, Yb, Tm, Ho, etc.

Recently, slabs constructed to permit light to travel along a zig-zag path have gained popularity because of their ability to reduce thermal effects experienced by the slab during laser operation. Specifically, during high average power operation solid state lasers experience local refractive index variations, thermal lensing and stress birefringence of the slab. The geometry and further improvements to the zig-zag slab laser have addressed these problems and have helped to overcome the optical beam distortion due to these thermal effects. For more information about zig-zag slabs for solid state lasers the reader is referred to U.S. Pat. No. 4,894,839 to Baer; U.S. Pat. No. 5,479,430 to Shine, Jr., et al. and to U.S. Pat. No. 6,134,258 to Tulloch et al.

As slabs permitting zig-zag beam propagation have gained popularity, the technical challenge has shifted to fabrication methods. The doping of the slab can be achieved by a number of known approaches, including the Czochralski growth method, which is particularly well-suited for making slabs of YAG doped with Nd (Nd:YAG lasers). In order to achieve high power operation an optimal doping concentration balancing optical gain with optical loss is desirable. A method for achieving high active ion concentrations is described in U.S. Pat. No. 6,014,393 to Fulbert et al., as well as the other related applications. More specifically, Fulbert teaches how to achieve base material doping levels such that the ion concentration is equal to or higher than 2%. Further, recent research into lasers based on poly-crystalline host materials (i.e., ceramics) has led to $Nd^{3+}$ dopant ion concentrations of around 10% in YAG.

The numerous advantages of zig-zag slab lasers are counterbalanced by the difficulties encountered in their manufacture. The prior art teaches several aspects of the manufacturing process of zig-zag slabs in U.S. Pat. Nos. 6,377,593; 6,472,242 and 6,566,152 all to Peterson et al.

The prior art also teaches which portion of the slab should be doped by Injeyan et al. in U.S. Pat. Nos. 6,094,297 and 6,256,142.

In addition, the prior art even teaches how to appropriately integrate elements into the slab—for example half/quarter wave plates—see the published patent application U.S. Patent Application 2002/0171918 to Clapp.

These prior art references teach how to build a zig-zag slab for use as laser or amplifier, however, the techniques disclosed are not suitable for batch processing. More particularly, they are not well-suited for rapid and low-cost manufacture of a large number of slabs for solid state lasers. This is especially true for cases where the performance and doping have to be well controlled and very good performance of the slab lasers is a requirement.

OBJECTS AND ADVANTAGES

In view of the shortcomings of the prior art, it is a primary object of the present invention to provide a method for fabricating a large number of slabs that can be used in solid state lasers. More specifically, it is an object of the invention to provide a method for batch manufacturing of such slabs and in such a manner that the improved performance characteristics of slabs are retained.

It is also an object of the invention to ensure that the process of manufacture is easy to implement and cost effective.

These and numerous other objects and advantages of the present invention will become apparent upon reading the following description.

SUMMARY

In one embodiment the present invention includes a method for efficiently producing a large number of zig-zag slabs that can be used in solid state lasers. The method calls for providing two non-active media and an active medium. A medium as used herein includes glasses, ceramics, single-crystal materials and polycrystalline materials. The non-active media are typically undoped optical media. The active medium is typically the same material as the non-active media but it is doped with an active ion, such as ions of Nd, Yb, Er, Tm, Ho, etc. The two non-active media are bonded at two opposite faces of the active medium to produce a slab sandwich. The slab sandwich has coupling faces, i.e., faces through which light can be in- and out-coupled on the non-active media. The length of the slab sandwich is defined between the coupling faces and its width and thickness are defined along the two orthogonal directions.

The slab sandwich is diced approximately perpendicular to its thickness to produce slab slices. The slab slices have parallel surfaces coextensive with the length of the slab sandwich. These surfaces are rendered to obtain two total-internal-reflection (TIR) surfaces. The distance between the TIR surfaces defines a thickness of the slab slice. The slab slices are diced along a direction approximately perpendicular to the two total-internal-reflection surfaces and approximately along the length to produce a number of zig-zag slabs.

The method of invention admits of numerous embodiments. In one embodiment the bonding of non-active and active media is performed by diffusion bonding. In another embodiment the bonding is achieved by silicate bonding, as taught in U.S. Pat. Nos. 6,548,176, and 6,284,085. In still another embodiment the bonding is achieved by frit bonding.

The rendering step can include an initial dicing of the slab sandwich along a plane substantially parallel to the two TIR faces. Preferably, the initial dicing is performed to ensure that the thickness of the slab slice is precisely controlled. In a preferred embodiment, the initial dicing is performed to achieve a thickness in the range between 0.01 and 20 mm.

Furthermore, the rendering step typically includes polishing the two parallel surface as well as coating them.

The coating on the TIR surfaces is preferably designed to permit. TIR of the propagating laser beam, while preventing contamination of the TIR surfaces which induces scatter and absorption loss. For example, Teflon coatings were applied to TIR surfaces of face-pumped slab lasers to protect TIR surfaces from contamination by cooling water in U.S. Pat. No. 5,479,430. More recently, $SiO_2$ coatings have been used, as taught by Tulloch et al., in U.S. Pat. No. 6,134,258. It is further preferable for the TIR surface coatings to provide high loss (i.e., low reflectivity) for light incident at less than the critical angle for TIR, since some fraction of the amplified spontaneous emission (ASE) or spontaneous emission (SE) is incident at angles less than the TIR critical angle. Finally, in cases where the slab is optically pumped through the TIR surfaces, it is preferable for the TIR surface coatings to provide low transmission loss at the pump wavelength.

The coupling faces are also processed. In some embodiments the coupling faces are polished. In other embodiments the coupling faces are diced and polished to predetermined angles. These angles will typically be different and will correspond to the angles desired for in- and out-coupling of light during operation. Furthermore, in any of these embodiments the coupling faces can be anti-reflection coated to reduce light losses.

The side walls of diced zig-zag slabs are preferably treated to further improve the confinement or retention of pump and generated light within the zig-zag slabs while promoting the loss of SE and ASE. In some embodiments this is achieved by roughening of at least one and preferably both side walls. The roughening can be controlled and parametrized such as to produce a certain amount of forward scatter of pump light in the zig-zag slab. In alternative embodiments the sidewalls can be polished to an appropriate degree and coated with materials whose index of refraction is chosen to channel the pump radiation into the slab but transmit the ASE out of the slab.

A detailed description of the invention and the preferred and alternative embodiments is presented below in reference to the attached drawing figures.

DETAILED DESCRIPTION OF THE EMBODIMENTS

Figure 1:
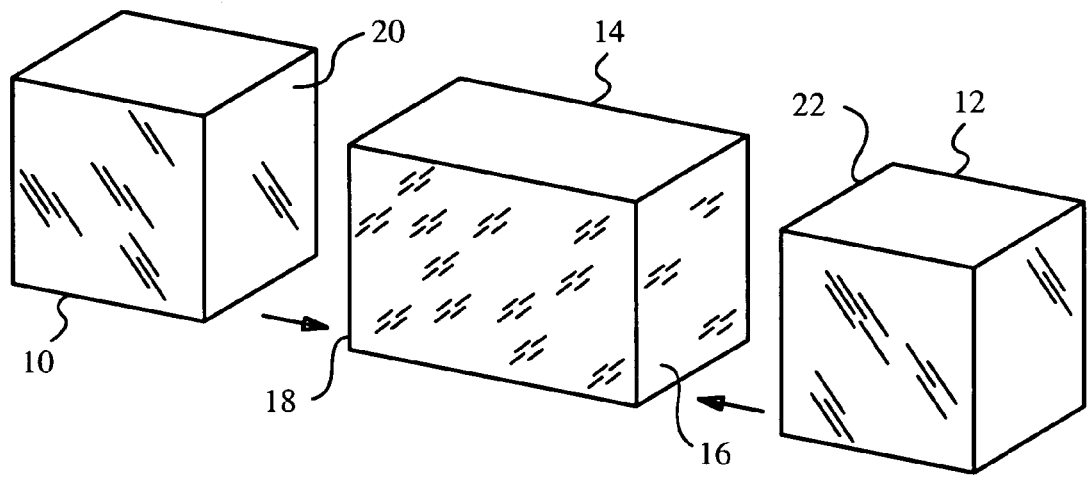
FIG. 1 illustrates the selection of active and non-active media according to the method of invention.

In accordance with the invention a number of zig-zag slabs for use as solid-state lasers or laser amplifiers are manufactured from two non-active media 10, 12 and an active medium 14, as shown in FIG. 1. Non-active and active media 10, 12, 14 preferably use the same host material. In the present embodiment the host material is YAG. In alternative embodiments host materials such as glass, poly-crystalline ceramics, or single-crystal materials can be used.

To provide optical gain, active medium 14 is doped with a lasant. The lasant can be an active ion such as Nd, Er, Yb Tm, Ho, etc. In the present embodiment, the lasant in active medium 14 is Yb and the doping level is 10%.

Figure 2:
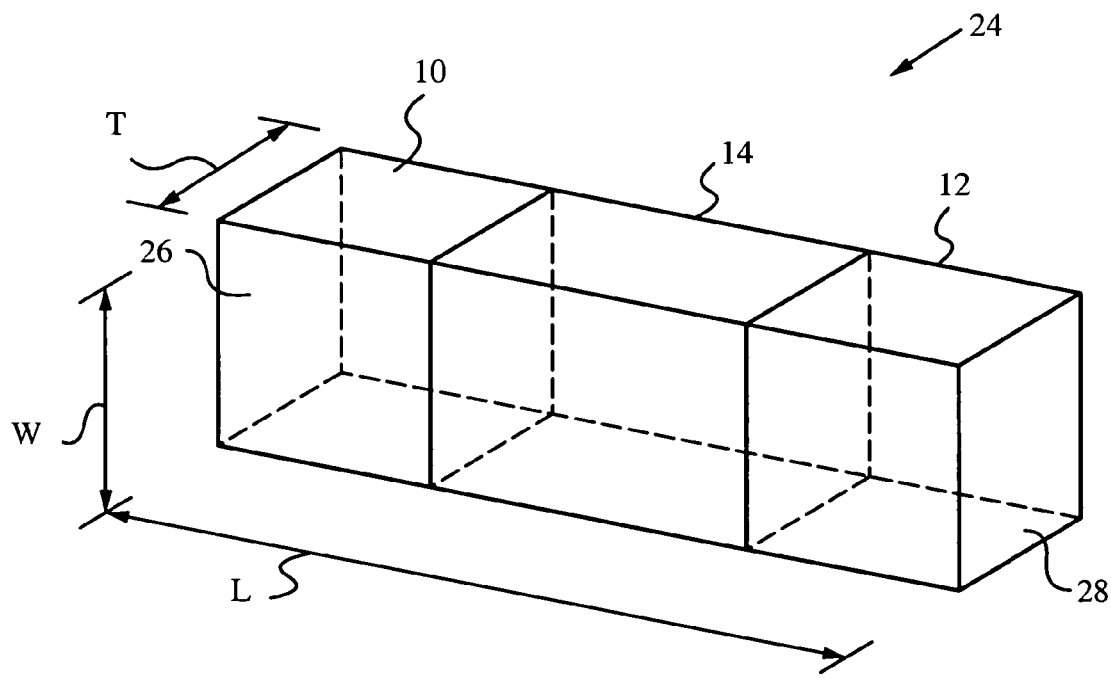
FIG. 2 is a view of a slab sandwich produced from two non-active media and an active medium.

Preferably, media 10, 12, 14 initially have the shape of parallelepipeds with flat surfaces for bonding non-active media 10, 12 at two opposite faces 16, 18 of active medium 14. Non-active medium 10 is bonded with face 20 and non-active medium 12 is bonded with face 22. The bonding process results in a slab sandwich 24 as shown in FIG. 2. The dimensions of media 10, 12, 14 are selected in advance such that bonded slab sandwich 24 has a requisite length L, width W and thickness T to allow for production of a desired number of zig-zag slabs after polishing and dicing, as described below.

The bonding process for bonding surfaces 20, 18 and 16, 22 can be any suitable process that produces an optical interface between the bonding surfaces. At least three methods including diffusion bonding, silicate bonding, and frit bonding are suitable for this purpose.

In accordance with the diffusion bonding method, bonding surfaces 20, 18 and 16, 22 are joined together to make one composite structure by first bringing them into optical contact to form an assembly. The assembly is then heated to a temperature on the order of the melting temperature of the host material, and interdiffusion of material at the two interfaces causes bonding. One of the advantages of diffusion bonding is that no glues or other agents are required for bonding media 10, 12, 14. On the other hand, the method requires holding media 10, 12, 14 at elevated temperatures frequently in excess of 1,000° C. for many hours. Diffusion bonding is known in the art, for example, as described in U.S. Pat. No. 5,441,803.

In accordance with the silicate bonding method a solution of NaOH and $SiO_2$ in water as the bonding agent is applied in the interfaces between surfaces 20, 18 and 16, 22 after these surfaces are polished and cleaned. A precise amount of the solution is applied to one of the surfaces to be bonded and then the surfaces are quickly joined. Typically, the bond begins to set within seconds. One of the advantages of this approach is that it is not time-intensive and is low-cost. For more information on this bonding method the reader is referred to U.S. Pat. Nos. 6,548,176, and 6,284,085.

The frit bonding method is known in the art and is typically used when the host material is a glass or a ceramic. In this method, ceramic powder is used as a frit between two surfaces to be bonded followed by heating to nearly the melting point to provide bonding.

In the present embodiment diffusion bonding is applied to create slab sandwich 24. Once complete, the interfaces between surfaces 20, 18 and 16, 22 delimiting the doped and un-doped regions of slab sandwich 24 are inspected to ensure that they are free of defects. A person skilled in the art will realize that various routine preliminary tests of slab sandwich 24 can be performed to ensure that its quality is sufficiently high to warrant continued processing. For example, a strength test can be applied to ascertain the force required to break the bond. The strength of the bond gives an indication of the amount of thermal stress the slab can handle during operation.

Non-active media 10, 12 provide coupling faces 26, 28 at two opposite ends of slab sandwich 24. Length L of slab sandwich 24 is defined as the distance between coupling faces 26, 28, as shown in FIG. 2. Width W and thickness T of slab sandwich 24 are defined along the two directions orthogonal to length L.

Figure 3:
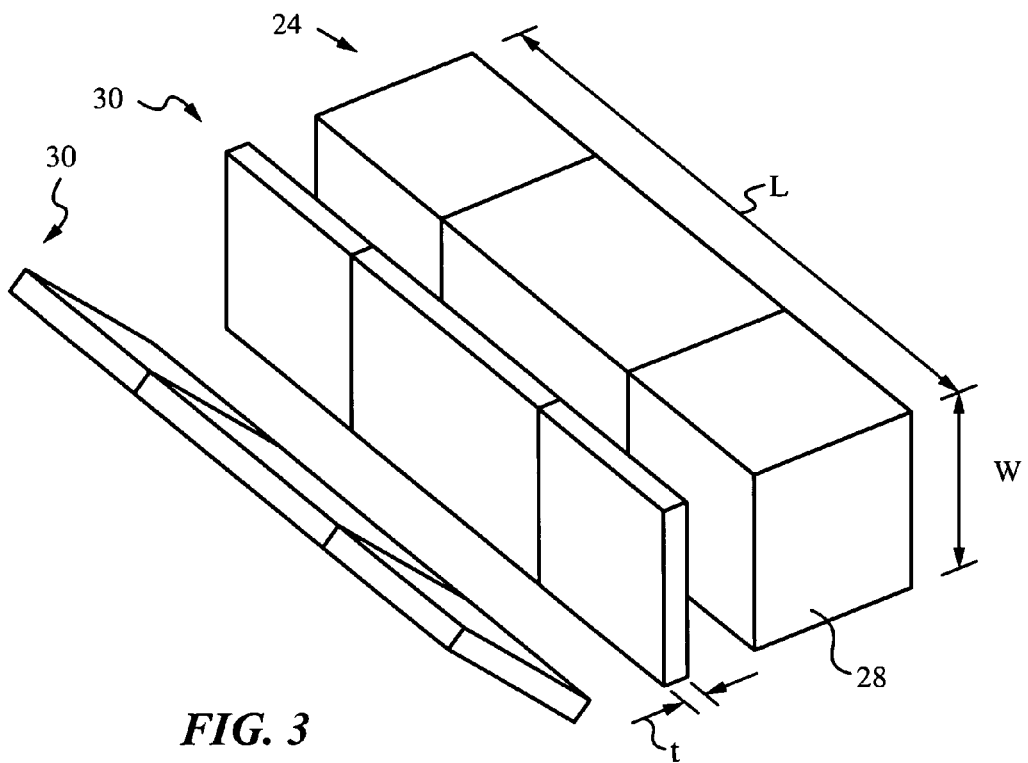
FIG. 3 illustrates the dicing of the slab sandwich of FIG. 2 into slab slices.

FIG. 3 illustrates the next step during which slab sandwich 24 is diced substantially perpendicular to thickness T to produce a number of slab slices 30. Each one of slab slices 30 is cut to a thickness t while retaining width W and length L. Two parallel surfaces 32, 34 (shown on FIG. 4) coextensive with length L are rendered to produce total-internal-reflection (TIR) surfaces. The rendering includes polishing since the dicing performed in the previous step leaves TIR surfaces 32, 34 with an undesirable degree of roughness. The polishing step should be precise enough to control thickness t of slab slice 30 to within +/−0.01 mm. In most cases final thickness t of slab slice 30 corresponds to the thickness of the zig-zag slab and is selected in the range between 0.01 mm and 20 mm.

Figure 4:
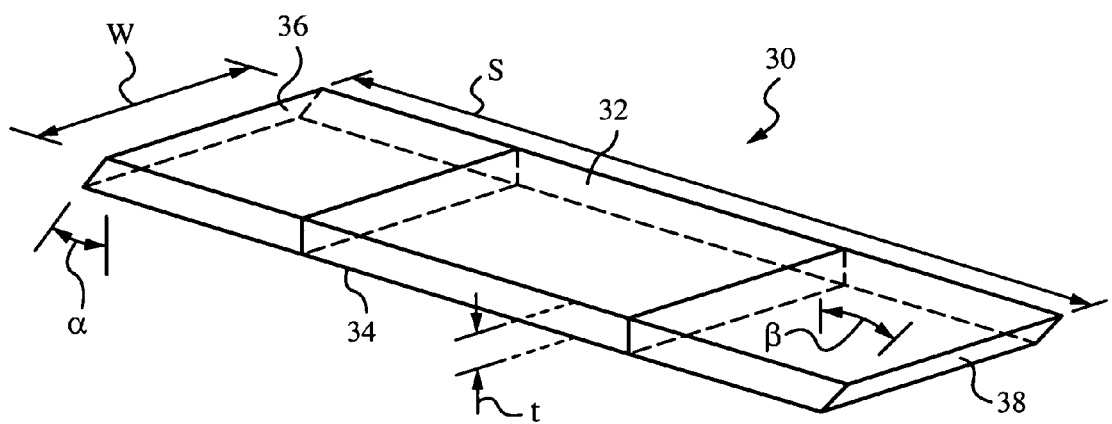
FIG. 4 is a view of a slab slice.

FIG. 4 illustrates further processing of one of slab slices 30. After dicing of the slab sandwich 24 slab slices 30 have coupling faces 36, 38 that are segments of coupling faces 26, 28 originally defined in slab sandwich 24. Coupling faces 36, 38 are processed to adapt them for in- and out-coupling of light that will be propagating through zig-zag slabs and to adjust the total length of zig-zag slabs based on the lengths of undoped and doped regions through which the light is to propagate. The processing of coupling faces 36, 38 thus includes cutting and polishing of coupling faces 36, 38 to produce certain angles $\alpha$, $\beta$ also referred to as apex angles in the art. In FIG. 4 the length of slab slice 30 has been reduced from L to S and coupling faces 36, 38 have been polished at apex angles $\alpha$ and $\beta$ respectively. In fact, the side cross-sectional view of processed slab slice 30 is analogous to that of a finished zig-zag slab as described below.

Figure 5A:
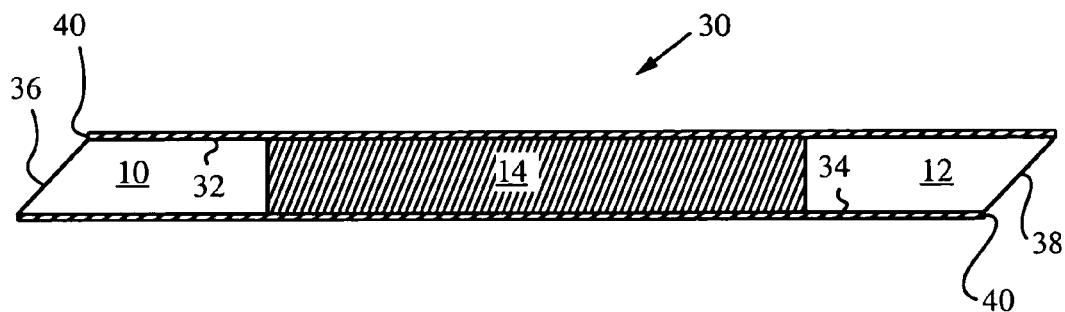
FIGS. 5A & B are plan side views illustrating the coatings applied to the slab slice of FIG. 4.

In addition to dicing and polishing, slab slice 30 is also coated as shown in the side views of FIGS. 5A&B. In particular, rendering of TIR surfaces 32, 34 preferably includes providing at least one of them, and preferably both, with a coating 40 to improve retention of laser light and/or to increase loss of undesired light such as ASE and other spurious light. Such coatings are either single-layer or multi-layer coatings.

In addition to protecting TIR surfaces 34 from contamination, coatings 40 can optionally provide improved optical performance in two distinct and independent ways. A first function of coatings 40 is to increase loss for light at the operating wavelength of the laser that is incident on the TIR surfaces 34 at less than the critical angle for TIR. Since some of this light is SE or ASE, coupling it out of the laser slab is desirable. For example, a coating providing a reflectivity of less than 1% for light at the operating wavelength of the laser that is incident on TIR surfaces 34 from within the slab at angles less than about 0.9 times the TIR critical angle is a suitable coating for this purpose. A second function of coatings 40 is to provide high transmissivity for light at a pump wavelength and incident on coatings 40. Such a coating design is beneficial in cases where optical pumping is performed through TIR surfaces 34. For example, a coating providing a reflectivity of less than 1% for light at a pump wavelength that is incident on TIR surfaces 34 from outside the slab at angles less than about 45 degrees is a suitable coating for this purpose. Design of single-layer and multi-layer coatings for such purposes, either independently or in combination, is known in the art.

Figure 5B:

FIG. 5B shows a coating 44 deposited on coupling faces 36, 38. Coating 44 is a single-layer or multi-layer coating as described above, designed to have minimal transmission loss at the laser operating wavelength. In some cases, where optical pumping is performed through coupling face 36 and/or coupling face 38, coating 44 is also designed to provide low transmission loss at the pump wavelength.

Figure 6:
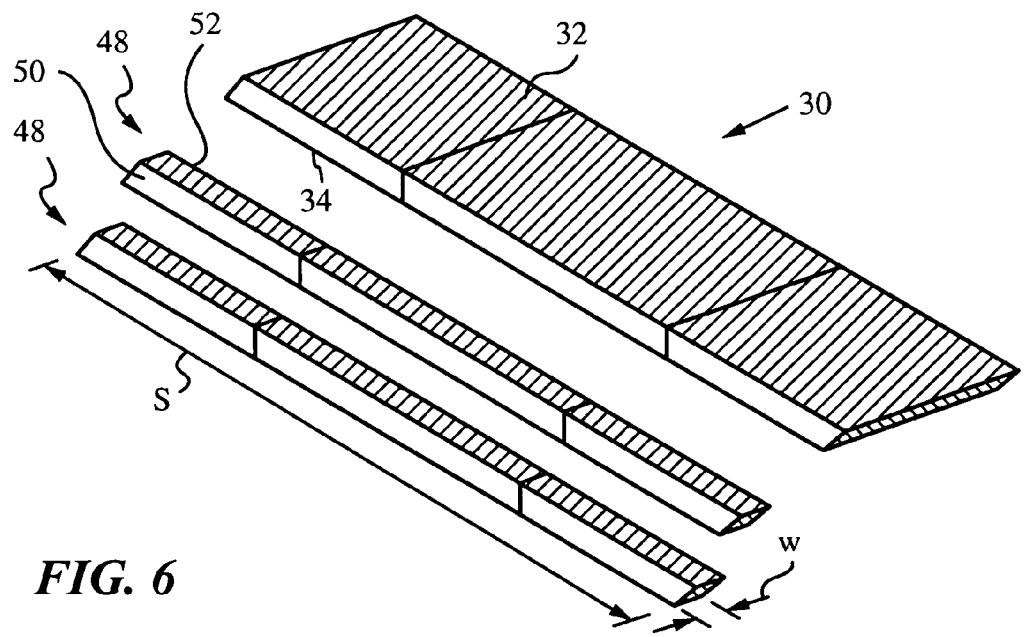
FIG. 6 illustrates the dicing of a coated slab slice into zig-zag slabs.

FIG. 6 illustrates the dicing of coated slab slice 30 into individual zig-zag slabs 48. Slab slice 30 is diced approximately perpendicular to TIR surfaces 32, 34 and along the length S of slab slice 30. After dicing each zig-zag slab 48 has two side walls 50, 52 defining a zig-zag slab of width w. Side walls 50, 52 exhibit a surface roughness as dictated by the dicing process. At this point zig-zag slab 48 can be used as a laser or amplifier.

Figure 7:
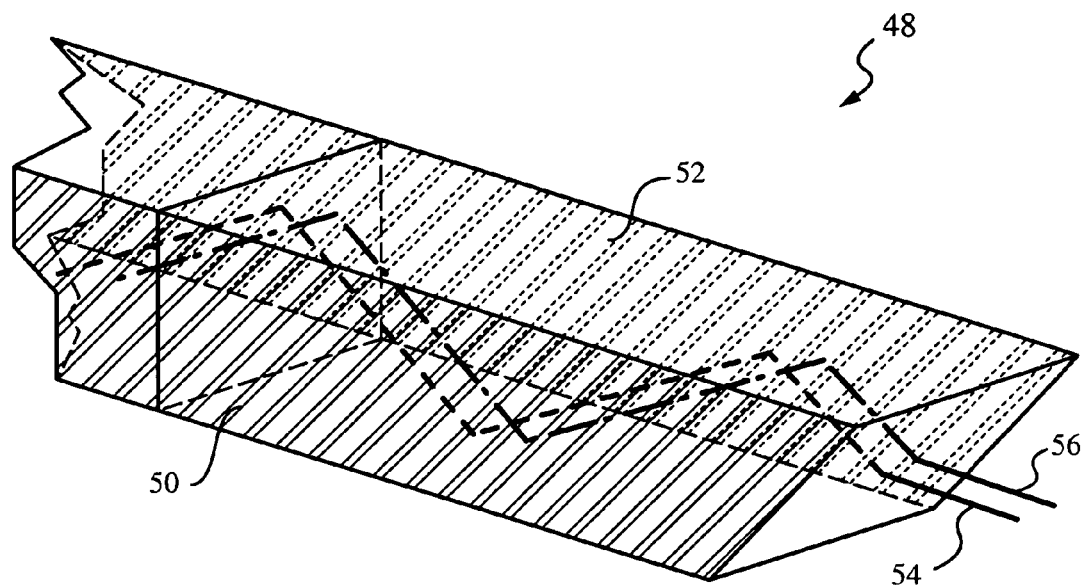
FIG. 7 shows a portion of a zig-zag slab with treated side walls.

It is preferable, however, that zig-zag slabs 48 undergo further treatment. In particular, side walls 50, 52 of each zig-zag slab 48 should be treated to adjust surface roughness and other surface properties, as illustrated in FIG. 7. FIG. 7 shows only a portion of zig-zag slab 48 as well as laser light 54 and pump light 56 propagating through it. In this embodiment side walls 50, 52 are further roughened in order to promote losses through side walls 50, 52 and thus decrease SE and ASE produced at the wavelength of laser light 54. Of course, losses of SE and ASE through side walls 50, 52 also promote the loss of pump light 56. The roughening can be controlled to achieve a certain amount of forward scatter of pump light 56 into zig-zag slab 48 and thereby control its loss. A person skilled in the art will appreciate that the loss of pump light has to be balanced with the advantages of reduced SE and ASE. In some embodiments increasing the intensity of pump light 56 or side pumping can be used in accordance to well-known practices. In still other embodiments side walls 50, 52 can be polished rather than roughened. In these embodiments confinement of pump light 56 is improved but SE and ASE are typically increased.

Figure 8A:
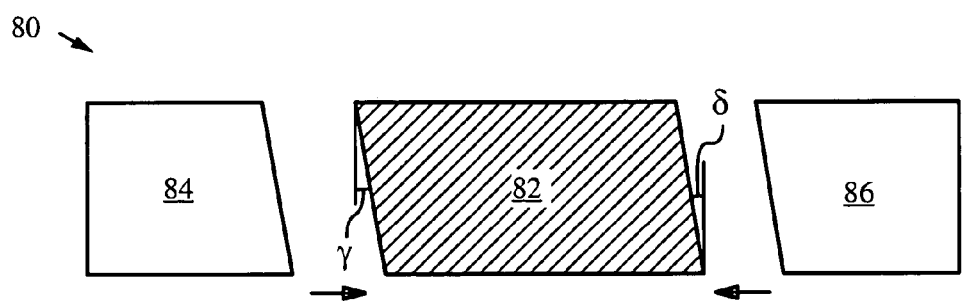
FIGS. 8A & B illustrate alternative embodiments of the method.

FIGS. 8A&B illustrate several alternative embodiments of the method. FIG. 8A illustrates a slab sandwich 80 in which an active medium 82 is treated and polished at angles $\delta$ and $\gamma$ prior to attaching two non-active media 84, 86. Such treatment can be used to ensure better coupling of light from and into doped and undoped (active and non-active) portions of the finished zig-zag slab.

Figure 8B:
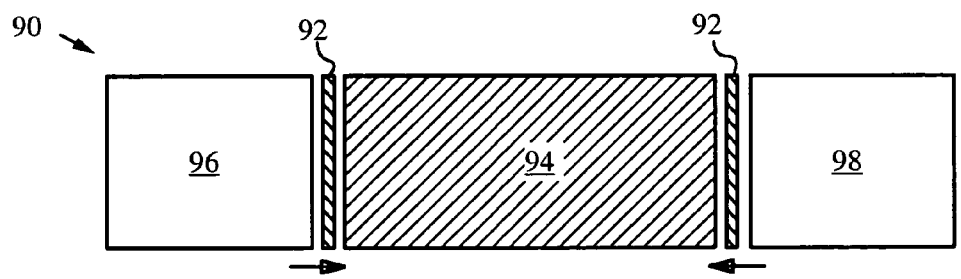

FIG. 8B illustrates another slab sandwich 90 in which index-matching layers 92 are interposed between active mediums 94 and non-active media 96, 98. Such treatment may be used to reduce reflection induced by an index difference between active medium 94 and non-active media 96, 98.

In view of the above, it will be clear to one skilled in the art that the above embodiments may be altered in many ways without departing from the scope of the invention. Accordingly, the scope of the invention should be determined by the following claims and their legal equivalents.

What is claimed is:
1. A method for producing a plurality of zig-zag slabs, said method comprising:
   a) providing two non-active media and an active medium;
   b) bonding said two non-active media at two opposite faces of said active medium thereby producing a slab sandwich having coupling faces on said non-active media, a length defined between said coupling faces, a width and a thickness;
   c) dicing said slab sandwich substantially perpendicular to said thickness to produce slab slices;

d) rendering two total-internal-reflection (TIR) surfaces of said slab slices from two parallel surfaces coextensive with said length of said slab sandwich;

e) dicing said slab slices substantially perpendicular to said two TIR surfaces and substantially along said length to produce said plurality of zig-zag slabs.

2. The method of claim 1, wherein said bonding comprises a method selected from the group consisting of diffusion bonding, silicate bonding, and frit bonding.

3. The method of claim 1, wherein said rendering comprises polishing of at least one of said two parallel surfaces.

4. The method of claim 3, wherein said dicing of said slab sandwich and said polishing are performed such that said thickness of said slab slice defined between said two parallel surfaces is in a range between 0.01 and 20 mm.

5. The method of claim 1, wherein said rendering comprises providing a coating on at least one of said two parallel surfaces.

6. The method of claim 5, wherein said coating provides total internal reflection for laser light traveling along a zig-zag optical path within one of said plurality of zig-zag slabs.

7. The method of claim 5, wherein said coating provides reflectivity less than 1% for light at a laser wavelength and incident on said TIR surface from within said zig-zag slab at an angle of incidence less than about 0.9 times the TIR critical angle.

8. The method of claim 5, wherein said coating provides reflectivity less than 1% for light at a pump wavelength and incident on said TIR surface from outside said zig-zag slab at an angle of incidence less than about 45 degrees.

9. The method of claim 1, further comprising processing said coupling faces.

10. The method of claim 9, wherein said processing of said coupling faces comprises polishing.

11. The method of claim 9, wherein said processing of said coupling faces comprises coating.

12. The method of claim 9, wherein said processing of said coupling faces comprises cutting and polishing to predetermined angles.

13. The method of claim 1, further comprising treating at least one side wall of said zig-zag slabs.

14. The method of claim 13, wherein said treating comprises roughening of said at least one side wall.

15. The method of claim 14, wherein said roughening is performed to produce a predetermined forward scatter of pump light in said zig-zag slab.

16. The method of claim 13, wherein said treating comprises polishing of said at least one side wall.

* * * * *